June 4, 1935.  W. A. PIPKIN  2,004,056
METHOD AND MACHINE FOR EXTRACTING OIL FROM THE PEELS OF CITRUS FRUIT
Filed March 6, 1933   3 Sheets-Sheet 1
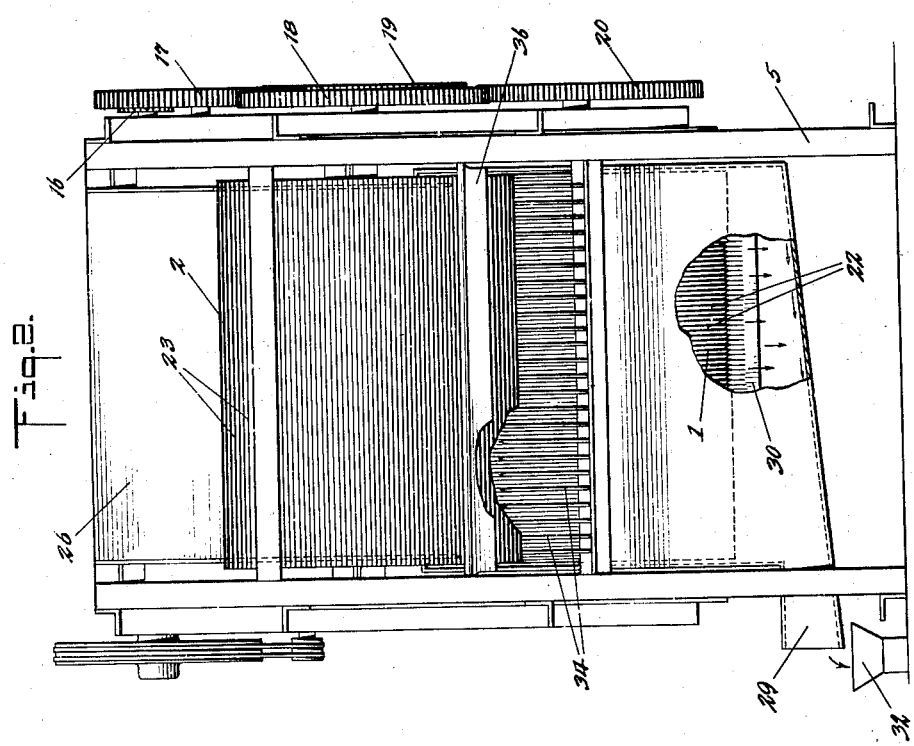
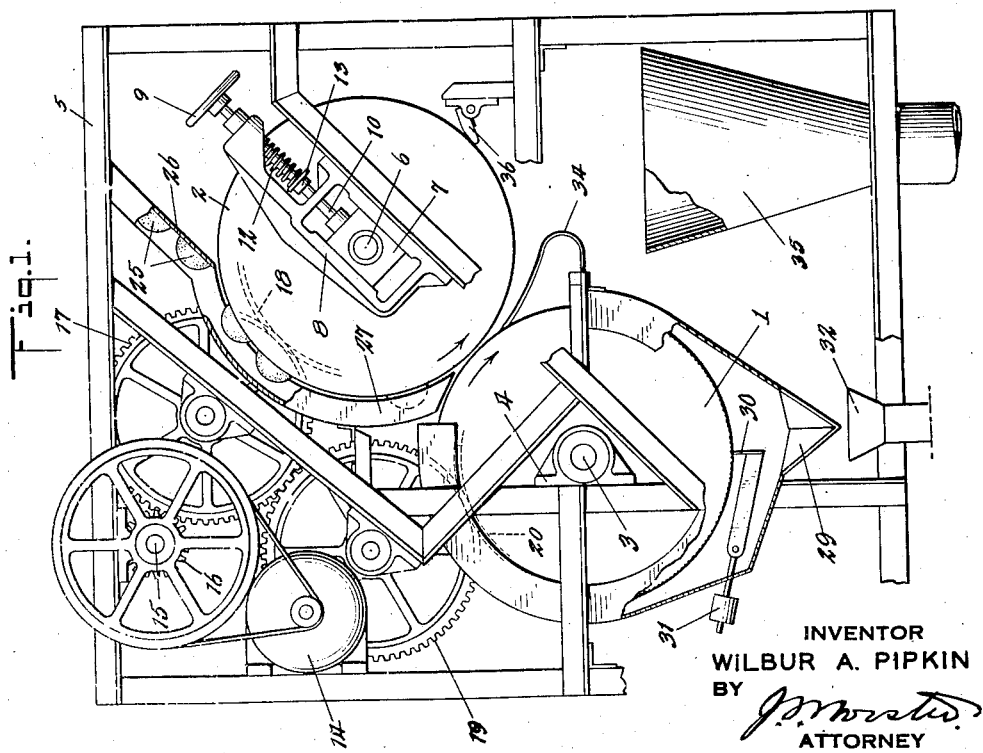
INVENTOR
WILBUR A. PIPKIN
BY
ATTORNEY June 4, 1935.   W. A. PIPKIN   2,004,056
METHOD AND MACHINE FOR EXTRACTING OIL FROM THE PEELS OF CITRUS FRUIT
Filed March 6, 1933   3 Sheets-Sheet 2

INVENTOR
WILBUR A. PIPKIN
BY
ATTORNEY

June 4, 1935.  W. A. PIPKIN  2,004,056
METHOD AND MACHINE FOR EXTRACTING OIL FROM THE PEELS OF CITRUS FRUIT
Filed March 6, 1933  3 Sheets-Sheet 3

INVENTOR
WILBUR A. PIPKIN
BY
ATTORNEY

Patented June 4, 1935

2,004,056

UNITED STATES PATENT OFFICE 2,004,056

METHOD AND MACHINE FOR EXTRACTING OIL FROM THE PEELS OF CITRUS FRUIT

Wilbur A. Pipkin, Safety Harbor, Fla.

Application March 6, 1933, Serial No. 659,713

10 Claims. (Cl. 100—47)

This invention relates to a method and machine for extracting oil from the peels of citrus fruit and other oil-bearing materials and has for its object to extract the maximum amount of oil from such materials in a minimum time and at considerably less cost than heretofore.

Another object of the invention is to provide an improved machine of the type referred to which is adapted to feed the peels, apply a uniform controlled pressure thereto so as to rupture the oil-bearing cells and expel the oil without cutting, shredding, macerating or kneading the peels, discharge the peels and separately discharge the oil without manual manipulation or supervision.

Prior to the invention of the method and machine disclosed in my Patent #1,798,555, issued March 31, 1931, on which the present invention is an improvement, there were four generally accepted methods of extracting oil from the peels of oranges, lemons and other citrus fruit. These methods were known as:

Hand-pressing, which consists in carefully peeling the citrus fruit, reversing the curvature of the peel, applying a sponge to the concave oil-bearing skin side, and dexterously kneading, pressing, and crimping the peel, so as to rupture the oil cells; the sponge absorbs the free oil, and is used to wipe off any adhering drops.

Displacement, which consists in lightly rolling the whole citrus fruit over a nest of closely set needles, thereby puncturing the individual oil cells, and expelling the oil therefrom, which flows down the needles.

High pressure on grated citrus peel, which consists in grating the top skin containing the oil cells off the whole fruit and subjecting the finely grated mass of oil cells, fibre and skin, to a very high continuous pressure in a separate machine.

Juice method, which consists in passing the whole citrus fruit through a series of grinding and squeezing rolls which break and tear the oil cells, thereby releasing the oil which is washed out by the juice; the liquid product being run through a centrifuge by which the oil is separated.

The first three methods referred to above required tedious and expensive hand manipulation and were wasteful of oil, and the product, known as "hand-pressed" oil, was contaminated with fibres from the peel and had to be further processed before marketing. The fourth method was not only wasteful of oil and of fruit but was further objectionable because it required expensive machinery for grinding the fruit and for separating the oil from the juice.

Other mechanical methods of extracting citrus peel oil have been proposed, but, so far as I am aware, they have never been put into general commercial use. These ordinarily depend upon the fact that when the peel is distorted, the oil cells are broken in a manner similar to the hand-pressing method of extraction; and are performed with coarsely grooved rollers or screws which so corrugate, bruise and knead the peel that the oil cells are broken and the oil discharged. In methods of this type there is a large loss of oil which adheres to the bruising rollers and to the peel, and the oil is also contaminated with fibres from the peel.

The method and machine disclosed in my Patent #1,798,555 reduced the cost of producing these oils by reducing the manual labor and by turning out a cleaner product in a shorter time than previous methods. In that patent the yellow oil-bearing surface of the peel is placed on a foraminous surface such as a screen and a cell-bursting pressure is applied to the upper side of the peel, for example by moving a pressure roll over the screen, so as to rupture the oil-bearing cells and expel the oil through the openings in the screen. In the particular machine shown in the patent the peels are placed on the screen by hand and are removed by hand after the oil is extracted, which is a factor limiting the capacity of the machine. Also, it is difficult to get all the oil out of the screen and hence some oil may adhere to the peels and be discarded therewith. These objections, coupled with the fact that screens are soon destroyed by the constant application of pressure thereto, have led me after considerable study and experiment to the present invention which largely eliminates all of the above difficulties.

Broadly, my improved method consists in supporting the oil-bearing surface of the peel on a surface containing a plurality of closely spaced projections which cooperate to support the peel in a substantially unbroken state when under pressure while leaving the oil-bearing cells unobstructed, applying a cell-bursting pressure against the reverse side of the peel to expel the oil from the oil-bearing cells into the spaces between said projections and retain it therein by capillary attraction out of contact with the peel, and finally collecting the oil. The machine for carrying out this method comprises a pair of cooperating relatively movable pressure members which are adapted to move the peel between them, preferably with a rolling motion. At least one of these pressure members, the one which contacts with the yellow oil-bearing surface of the peel, contains projections or grooves constructed and spaced as stated above to rupture the oil cells in the oil-bearing surface of the peel and to receive the oil which is expelled from said cells upon the application of pressure to the reverse side of the peel by the cooperating pressure member. The machine also has means for feeding the peel to the pressure members, means for collecting the oil extracted from the peel, and means for separately discharging the peel.

In one machine which I shall use to illustrate the invention the pressure members comprise a pair of horizontal rotatable rolls which are relatively adjustable to control the pressure on the peel, although the rolls may be mounted on vertical axes or in any other suitable manner. When the rolls are horizontal one roll preferably has its pressure surface grooved in a circumferential direction, the spaced circumferential projections or peaks of the grooves cooperating to support the peel as stated above and the grooves being deep and narrow enough to receive oil from the oil-bearing cells in the peel and retain it by capillary attraction out of contact with the peel as the roll revolves. The cooperating roll may have similar grooves, or may have a smooth pressure surface, or may be provided with any suitable projections for frictionally engaging the inner or fibrous surface of the peel and may have a cooperating guard whereby, when a peel is fed on top of said roll, it is held by the frictional surface and fed to the point where it passes between the two rolls with the oil-bearing surface of the peel against the circumferentially grooved roll. Then, as the peel passes between the rolls, it is subjected to a uniform rolling pressure which bursts the oil cells in the supported oil-bearing surface of the peel and expels the oil.

The oil extracted in this manner is expelled into the deep and narrow furrows of the circumferentially grooved roll and is held therein by capillary attraction and carried around by said roll. A portion of this oil may drain from the grooves into a collector and the remainder may be deflected into the collector by a doctor blade or other suitable means. The peel may be separately ejected in any suitable manner, for example by providing a plurality of prongs adjacent the delivery side of the rolls in close enough proximity to the circumferential grooves to dislodge or strip the peel from the projections and eject it over the surfaces of the prongs without removing oil from the grooves. Preferably, means are also provided for removing particles of peel from the other roll.

These and other features and advantages of the invention will be described in connection with the accompanying drawings, in which:

Fig. 1 is a side view of a machine embodying the invention;

Fig. 2 is a front view thereof;

Figure 3:
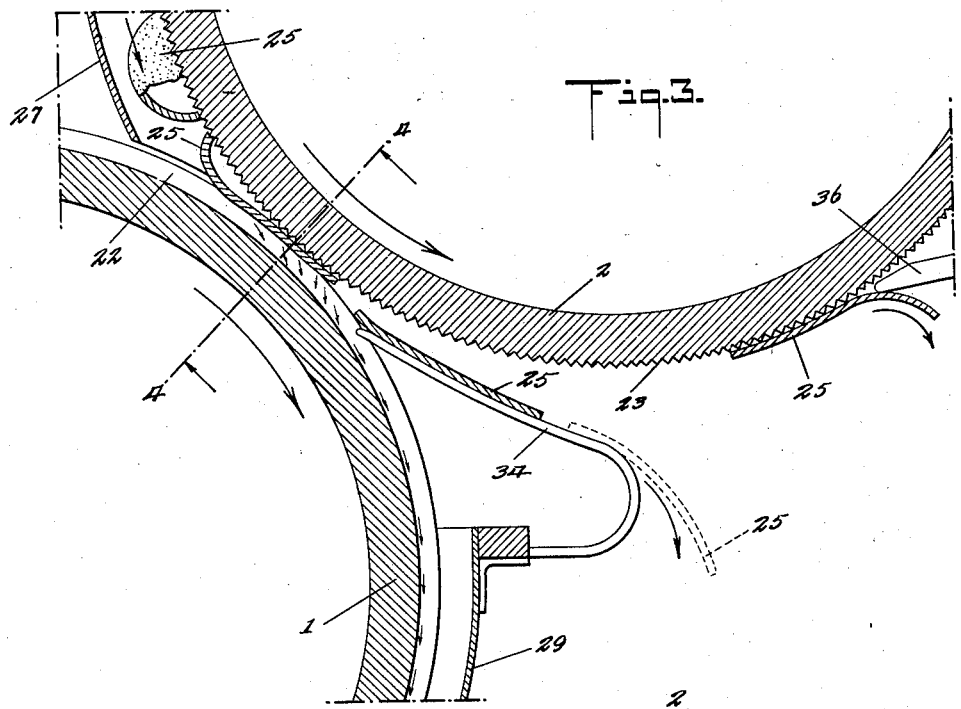
Fig. 3 is an enlarged vertical section through the rolls, illustrating the progress of the peels.

The machine shown in Figs. 1 to 4 comprises cooperating horizontal rolls 1 and 2. Roll 1 is mounted on shaft 3 which is journaled in bearings 4 on opposite sides of frame 5. Roll 2 is mounted on shaft 6 which is journaled in bearing blocks 7 slidably mounted in channels 8 on opposite sides of the frame.

Roll 2 is mounted above roll 1 and may be adjusted toward or away from roll 1 to provide any desired clearance between the cooperating pressure surfaces. Adjustment is effected by means of hand wheels 9 carried by rods 10 which are threaded in bearing blocks 7 as shown in Fig. 1. Springs 12 surround rods 10 and are compressed between the ends of channels 8 and nuts or shoulders 13 on the rods, permitting roll 2 to yield and thereby pass sticks, stones or other hard foreign substances which might otherwise injure the pressure surfaces of the rolls. The clearance between rolls 1 and 2 depends upon the pressure to be exerted on the peels and may be determined by trial. A clearance of one-sixteenth inch is usually sufficient for the thickest citrus fruit peels.

The rolls are driven by motor 14 which rotates shaft 15 carrying pinion 16. This pinion meshes with gear 17 which in turn meshes with gear 18 carried by shaft 6 of roll 2. Gear 17 also meshes with gear 19 which in turn meshes with gear 20 carried by shaft 3 of roll 1. The rolls rotate in the direction of the arrows in Fig. 1 so as to move the peels between them with a rolling pressure.

Figure 4:
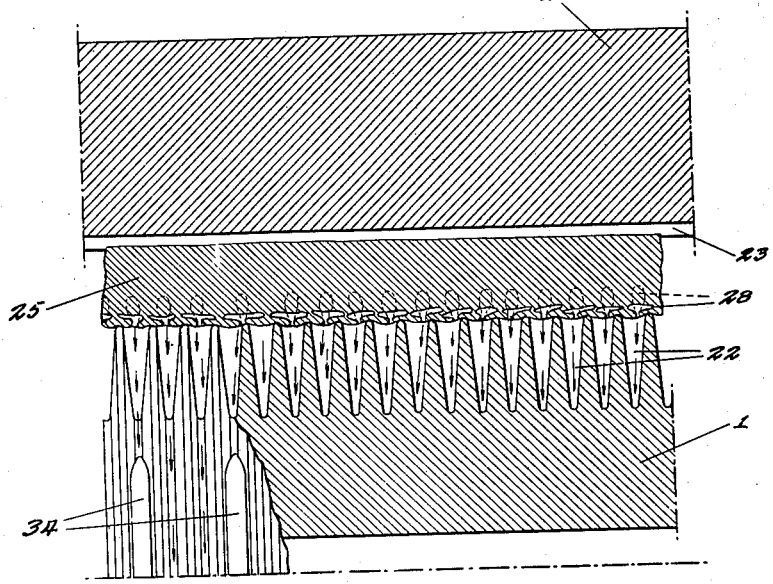
Fig. 4 is a fragmentary cross-section on line 4—4 of Fig. 3.

The peripheral or pressure surface of roll 1 is formed into a plurality of closely spaced parallel circumferential projections forming grooves 22 as best shown in Figs. 2 and 4. The dimensions and spacing of these grooves may vary but their projections are close enough together to support the yellow oil-bearing surface of the peel in a substantially unbroken state, that is, without cutting the skin or wedging it into the interior of the furrows when pressure is applied to the reverse side of the peel by roll 2. The grooves are also deep and narrow enough to receive the oil and retain it by capillary attraction out of contact with the peel, and to prevent the oil from being drawn out by the suction which is created when the peels are ejected after passing between the rolls. I have obtained excellent results with circumferential grooves substantially as shown in Fig. 4 in which the projections or teeth are blunted to avoid cutting the peels and the deep furrows are tapered inwardly for strength and ease in construction and to facilitate removal of the oil. In the machine illustrated roll 1 has eighteen such grooves to the inch. There are between four and five hundred oil cells per square inch of citrus fruit peel, and in general the cell openings are from 1/64 inch to $\frac{1}{32}$ inch in diameter, not more than 3% of said cells having openings less than 1/64 inch in diameter. In my machine the tops of the projections between grooves 22 are preferably less than 1/64 inch in width; hence if an oil cell having an opening smaller than the width of a projection happens to lie directly over said projection such oil cell may not be ruptured; but, since only about 3% of the cells fall in this category, the chances of not rupturing them becomes practically infinitesimal.

Roll 2 may have a plain pressure surface or may have its pressure surface grooved like roll 1. However, in Figs. 1 to 4 I provide the surface of roll 2 with a plurality of longitudinal grooves 23 for the purpose of frictionally engaging the inner or fibrous surface of the peel and carrying the peel in the proper position for presentation to roll 1.

The peels 25, usually in hemispherical form with the yellow oil-bearing surface outside as in the natural fruit, are fed along inclined chute 26 at the front of the machine which delivers the peels on top of roll 2 so that the concave or fibrous sides of the peels contact with the grooved surface 23. A concave trough 27 is mounted adjacent roll 2 and terminates adjacent the point where the peels pass between the two rolls. The peels are carried along between roll 2 and trough 27 until they pass beyond the lower end of the trough and between the two rolls.

As the peels pass between the rolls the oil-bearing surfaces of the peels are pressed firmly against the circumferentially grooved surface of roll 1, bursting the oil cells 28 as illustrated diagrammatically in Fig. 4 without cuting, macerating, kneading or shredding the peel. The oil expelled from the ruptured cells is ejected into circumferential grooves 22 and is mostly held in said grooves by capillary attraction. The oil carried around in grooves 22 is deflected into drip pan 29 by a suitable doctor blade or scraper 30 having means such as counterweight 31 for holding the teeth of the blade in the grooves and thereby deflecting the oil into the drip pan. The oil collecting in the drip pan is conveyed to any suitable receptacle by funnel 32.

The peel is dislodged or stripped from roll 1 by a series of prongs 34 which are mounted on the frame adjacent the delivery side of the roll. These prongs may comprise bent rods having pointed ends which project into grooves 22 just far enough to dislodge the peel without removing oil from said grooves. Since the rolls leave the peel intact it is not necessary to provide a prong for each groove, the particular machine shown in the drawing having the prongs spaced about three-quarters of an inch. The peels dislodged in this manner are discharged over the surfaces of prongs 34 and drop into chute 35 as shown in Fig. 1.

Fibres and pieces of peel adhering to roll 2 are dislodged by scraper 36 which extends the length of the roll and has a spring or other means pressing it lightly into engagement with the surface of said roll.

Figure 5:
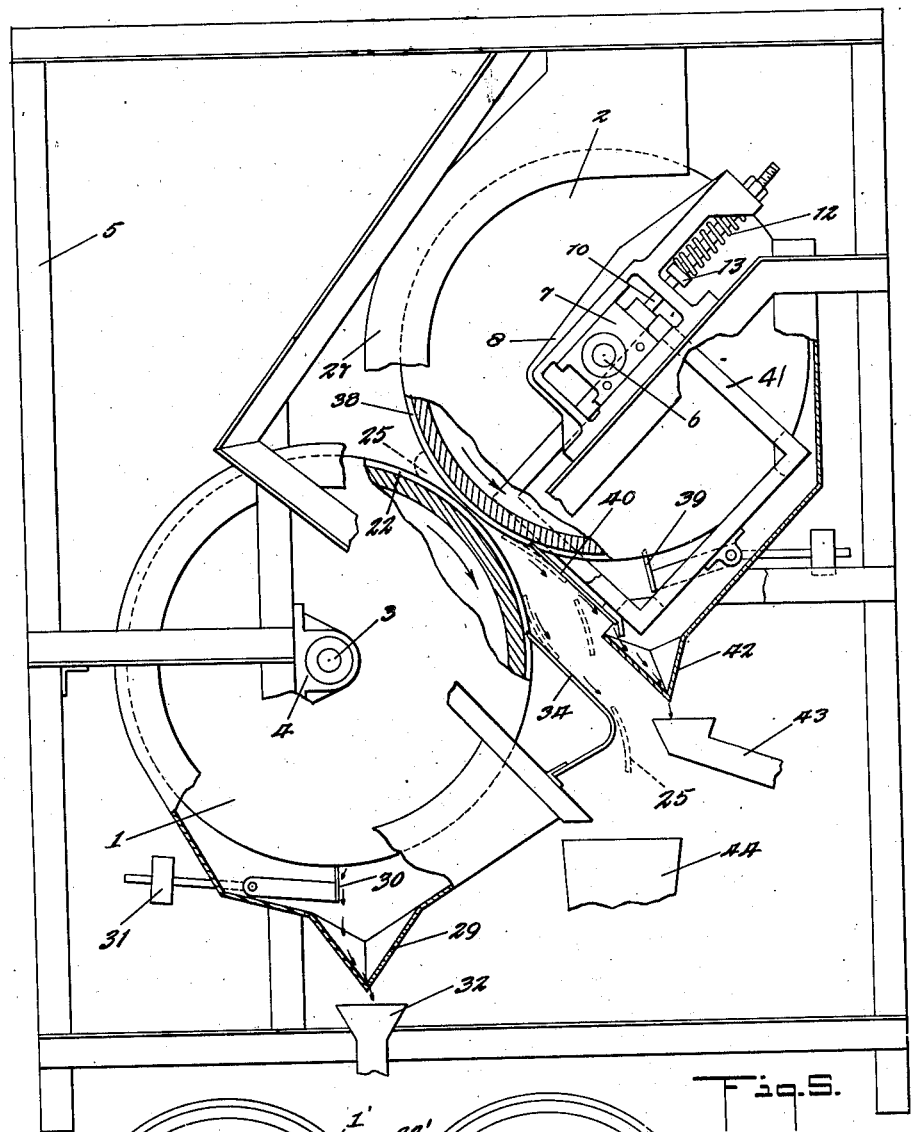
Fig. 5 is a side view of a modified machine.

In some cases I provide both of the cooperating rolls with circumferential grooves and I prefer such construction when treating peels which are doubled or folded over in such a way that the yellow oil-bearing surface appears on both sides as frequently happens when peels are removed by the scalding process, that is, when the fruit is dipped in scalding water to facilitate removal of the peel in large pieces. This is usually the condition in which grapefruit peels are received from the canning factory. Fig. 5 shows a machine which is specially adapted to handle each folded peels. This machine is similar to that previously described except that roll 2 is provided with circumferential grooves 38 corresponding with circumferential grooves 22 of roll 1. Grooves 22 and 38 may be of the same size and shape, or they may be of different sizes, spacing, etc., but they preferably do not mesh as meshing would tend to cut the peels.

In Fig. 5 roll 2 has a cooperating doctor blade 39 and ejector prongs 40 corresponding to doctor blade 30 and prongs 34 associated with roll 1. Blade 39 and prongs 40 are preferably carried by a frame 41 which is secured to slidable bearing blocks 7 in any suitable manner. If a hard foreign substance passes between rolls 1 and 2 causing bearings 7 to move against the tension of springs 12, or if the thickness of the peels passing between the rolls is sufficient to move said bearings, blade 39 and prongs 40 will move with roll 2 and will thus remain in proper contact with roll 2 at all times. Drip pan 42 is mounted beneath roll 2 and prongs 40 are so arranged that any oil flowing down these prongs will drip into pan 42. The oil collecting in pan 42 is conveyed to any suitable receptacle by funnel 43. The peels dislodged from both the rolls by prongs 34 and 40 drop into chute 44.

Figure 6:
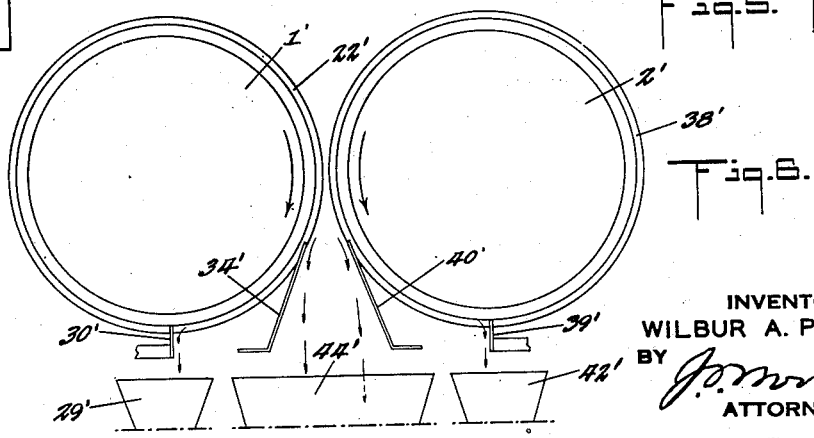
Fig. 6 is a diagrammatic view illustrating another modification of the invention.

In the machine shown in Fig. 6 cooperating rolls 1' and 2' are mounted in the same horizontal plane and their respective pressure surfaces contain circumferential grooves 22' and 38' similar to grooves 22 and 38 of rolls 1 and 2 in Fig. 5. The peels are dislodged from the rolls by prongs 34' and 40', dropping into chute 44', and the oil is scraped from the grooves by doctor blades 30' and 39' and collected in suitable drip pans or receptacles 29' and 42'. The rolls, of course, may be arranged in any other suitable manner and if mounted on vertical axes will preferably have the grooves parallel to the axes so that the oil may drain off the lower ends of the rolls.

It will be evident that various changes may be made in the details of construction and method of operation described herein without departing from the scope and spirit of the invention as defined by the appended claims.

The invention claimed is:

1. Method of extracting oil from the oil-bearing cells in citrus fruit peel, which comprises supporting the oil-bearing surface of the peel at a plurality of spaced areas so positioned as to support the surface sufficiently to permit substantially all the cells to be broken when pressure is applied to the peel while leaving the oil-bearing cells substantially unobstructed, applying pressure to the other surface of the peel while maintaining at least that portion of the peel to which pressure is being applied in a substantially unbroken state, thereby expressing oil from the peel, immediately removing the oil out of contact with the peel, and maintaining it out of such contact during the remainder of the expressing operation.

2. Method of extracting oil from the oil-bearing cells in citrus fruit peel, which comprises supporting the oil-bearing surface of the peel at a plurality of spaced areas so positioned as to support the surface sufficiently to permit substantially all the cells to be broken when pressure is applied to the peel while leaving the oil-bearing cells substantially unobstructed, applying a rolling pressure to the other surface of the peel while maintaining at least that portion of the peel to which pressure is being applied in a substantially unbroken state, thereby expressing the oil from the peel, immediately removing the oil out of contact with the peel, and holding it out of such contact by capillary attraction during the remainder of the expressing operation 3. In a machine for extracting oil from the oil-bearing cells in citrus fruit peel, a supporting surface composed of a plurality of blunt, closely spaced parallel projections forming capillary grooves and adapted to support the oil-bearing surface of the peel in a substantially unbroken state when under pressure while leaving the oil-bearing cells unobstructed, said supporting surface containing approximately eighteen such grooves to the inch and said grooves being deep and narrow enough to receive oil from said cells and retain it by capillary attraction out of contact with said peel, means for applying a cell-bursting pressure against the reverse side of said peel to expel the oil from said cells into said grooves, and means for discharging the oil from said grooves.

4. In a machine for extracting oil from the oil-bearing cells in citrus fruit peel, a rotatable support containing a plurality of blunt, closely spaced parallel projections extending in the direction of rotation of said support, said projections being arranged to support the oil-bearing surface of the peel in a substantially unbroken state when under pressure while leaving the oil-bearing cells unobstructed and forming grooves deep and narrow enough to receive oil from said cells and retain it by capillary attraction out of contact with said peel, means for rotating said support, means for applying a rolling pressure to the reverse side of said peel to progressively burst the oil-bearing cells in said peel and expel the oil therefrom into said grooves, means adjacent said support positioned to strip said peel from said projections, and means arranged to discharge the oil from said grooves.

5. In a machine for extracting oil from the oil-bearing cells in citrus fruit peel, a rotatable roll and a cooperating pressure surface adapted to move the peel between them with a rolling pressure, the surface of said roll being formed into a plurality of blunt, closely spaced circumferential projections arranged to support the oil-bearing surface of said peel in a substantially unbroken state when under pressure while leaving the oil-bearing cells unobstructed and forming grooves deep and narrow enough to receive oil from said cells and retain it by capillary attraction out of contact with said peel, means for rotating said roll to progressively burst the oil-bearing cells in said peel and expel the oil therefrom into said grooves, means adjacent said roll positioned to strip pressed peels from said projections, and means arranged to discharge the oil from said grooves.

6. In a machine for extracting oil from the oil-bearing cells in citrus fruit peel, a rotatable roll and a cooperating pressure surface adapted to move the peel between them with a rolling pressure, the surface of said roll being formed into a plurality of blunt, closely spaced circumferential projections arranged to support the oil-bearing surface of said peel in a substantially unbroken state when under pressure while leaving the oil-bearing cells unobstructed and forming grooves deep and narrow enough to receive oil from said cells and retain it by capillary attraction out of contact with said peel, means for rotating said roll to progressively burst the oil-bearing cells in said peel and expel the oil therefrom into said grooves, a plurality of spaced prongs adjacent the delivery side of said roll positioned close enough to said grooves to dislodge the peel from said projections and discharge it over the surfaces of said prongs without removing oil from said grooves, and means arranged to discharge the oil from said grooves at a point beyond said prongs.

7. In a machine for extracting oil from the oil-bearing cells in citrus fruit peel, a rotatable roll and a cooperating pressure surface adapted to move the peel between them with a rolling pressure, the surface of said roll being formed into a plurality of blunt, closely spaced circumferential projections arranged to support the oil-bearing surface of said peel in a substantially unbroken state when under pressure while leaving the oil-bearing cells unobstructed and forming grooves deep and narrow enough to receive oil from said cells and retain it by capillary attraction out of contact with said peel, means for rotating said roll to progressively burst the oil-bearing cells in said peel and expel the oil therefrom into said grooves, a plurality of spaced prongs adjacent the delivery side of said roll positioned close enough to said grooves to dislodge the peel from said projections and discharge it over the surfaces of said prongs without removing oil from said grooves, and a scraper adjacent said roll closely fitting said grooves at a point beyond said prongs for discharging said oil.

8. In a machine for extracting oil from the oil-bearing cells in citrus fruit peel, a pair of cooperating rotatable rolls adapted to move the peel between them with a rolling pressure, the pressure surfaces of said rolls being composed of blunt, closely spaced non-meshing circumferential projections arranged to maintain the surfaces of said peel in a substantially unbroken state while leaving the oil-bearing cells unobstructed and forming grooves deep and narrow enough to receive the oil from said cells and retain it by capillary attraction out of contact with said peel, means for rotating said rolls to progressively burst the oil-bearing cells in said peel and expel the oil therefrom into said grooves, means adjacent said rolls positioned to eject pressed peels therefrom, and means arranged to discharge the oil from said grooves.

9. In a machine for extracting oil from the oil-bearing cells in citrus fruit peel, a rotatable roll and a cooperating pressure surface adapted to move the peel between them with a rolling pressure, the surface of said roll being formed into a plurality of blunt, closely spaced circumferential projections arranged to support the oil-bearing surface of said peel in a substantially unbroken state when under pressure while leaving the oil-bearing cells unobstructed and forming grooves deep and narrow enough to receive oil from said cells and retain it by capillary attraction out of contact with said peel, said roll containing approximately eighteen such grooves to the inch, means for rotating said roll to progressively burst the oil-bearing cells in said peel and expel the oil therefrom into said grooves, means adjacent said roll positioned to eject pressed peels therefrom, and means arranged to discharge the oil from said grooves.

10. In a machine for extracting oil from the oil-bearing cells in citrus fruit peel, a pair of rotatable rolls cooperating to move the peel between them with a cell-bursting pressure, means for rotating said rolls, means for feeding the peel upon the surface of one roll and means cooperating with said roll to guide said peel into engagement with the other roll, the pressure surface of at least one of said rolls being formed into a plurality of blunt, closely spaced circumferential projections arranged to support the oil-bearing surface of said peel in a substantially unbroken state when under pressure while leaving the oil-bearing cells unobstructed and forming grooves deep and narrow enough to receive oil from said cells and retain it by capillary attraction out of contact with said peel, means adjacent said rolls positioned to strip pressed peels from said projections, and means arranged to discharge the oil from said grooves.

WILBUR A. PIPKIN